Figure 1:
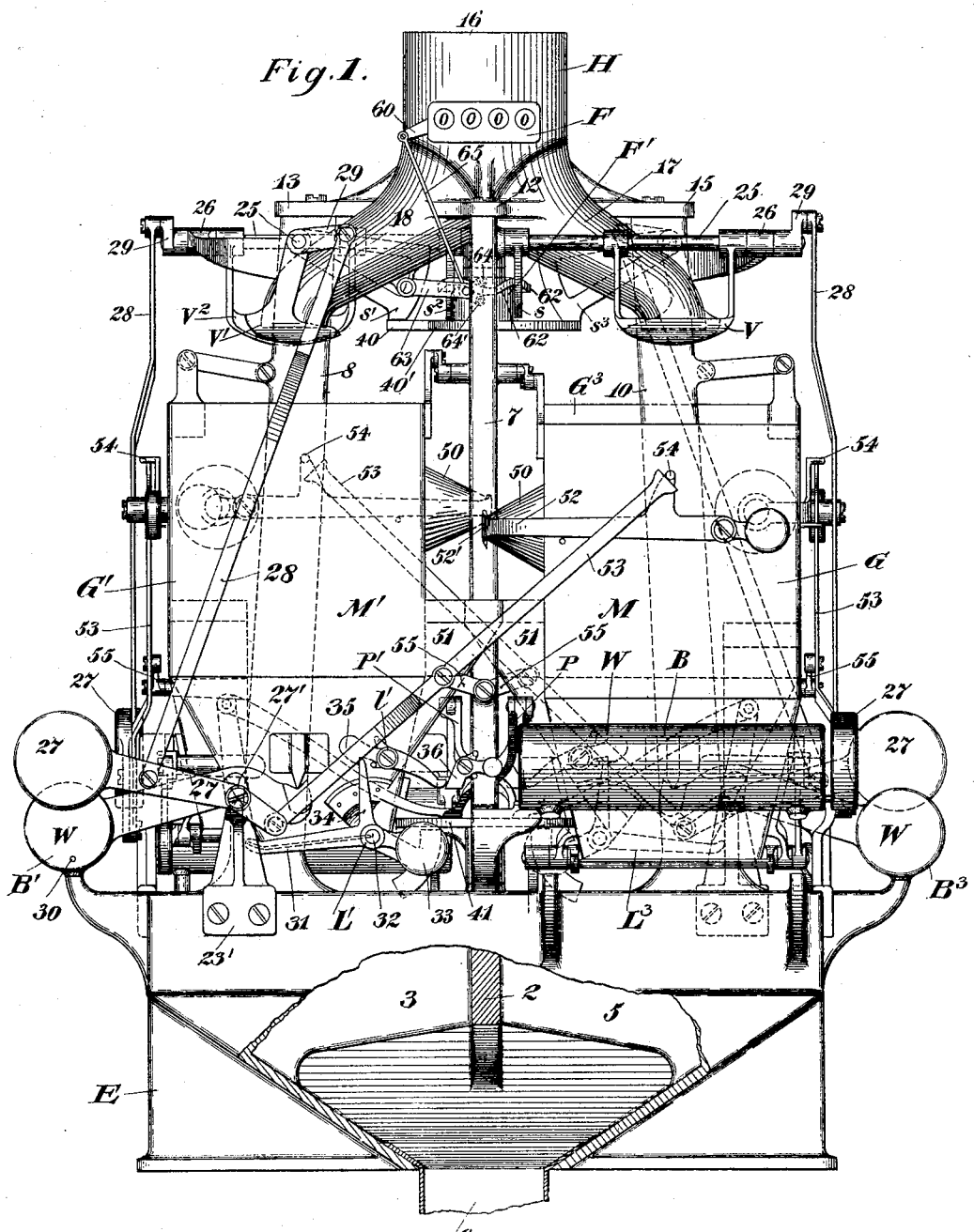

No. 615,198. Patented Nov. 29, 1898.
F. H. RICHARDS.
WEIGHING APPARATUS.
(Application filed Nov. 26, 1897.)

(No Model.) 7 Sheets—Sheet 1.

Witnesses.
R. T. Pittman
Fred. J. Dole.

Inventor.
F. H. Richards.

No. 615,198. Patented Nov. 29, 1898.
F. H. RICHARDS.
WEIGHING APPARATUS.
(Application filed Nov. 26, 1897.)

(No Model.) 7 Sheets—Sheet 2.

Witnesses
R. W. Pittman
Fred. J. Dole.

Inventor.
F. H. Richards

No. 615,198. Patented Nov. 29, 1898.
F. H. RICHARDS.
WEIGHING APPARATUS.
(Application filed Nov. 26, 1897.)

(No Model.) 7 Sheets—Sheet 3.

Witnesses.
R. W. Pittman
Fred. J. Dole.

Inventor.
F. H. Richards.

No. 615,198. Patented Nov. 29, 1898.
F. H. RICHARDS.
WEIGHING APPARATUS.
(Application filed Nov. 26, 1897.)
(No Model.) 7 Sheets—Sheet 4.

Witnesses.
R. W. Pittman
Fred. J. Dole,

Inventor.
F. H. Richards.

No. 615,198. Patented Nov. 29, 1898.
F. H. RICHARDS.
WEIGHING APPARATUS.
(Application filed Nov. 26, 1897.)

(No Model.) 7 Sheets—Sheet 5.

Witnesses.

Inventor

No. 615,198. F. H. RICHARDS. Patented Nov. 29, 1898.
WEIGHING APPARATUS.
(Application filed Nov. 26, 1897.)
(No Model.) 7 Sheets—Sheet 7.
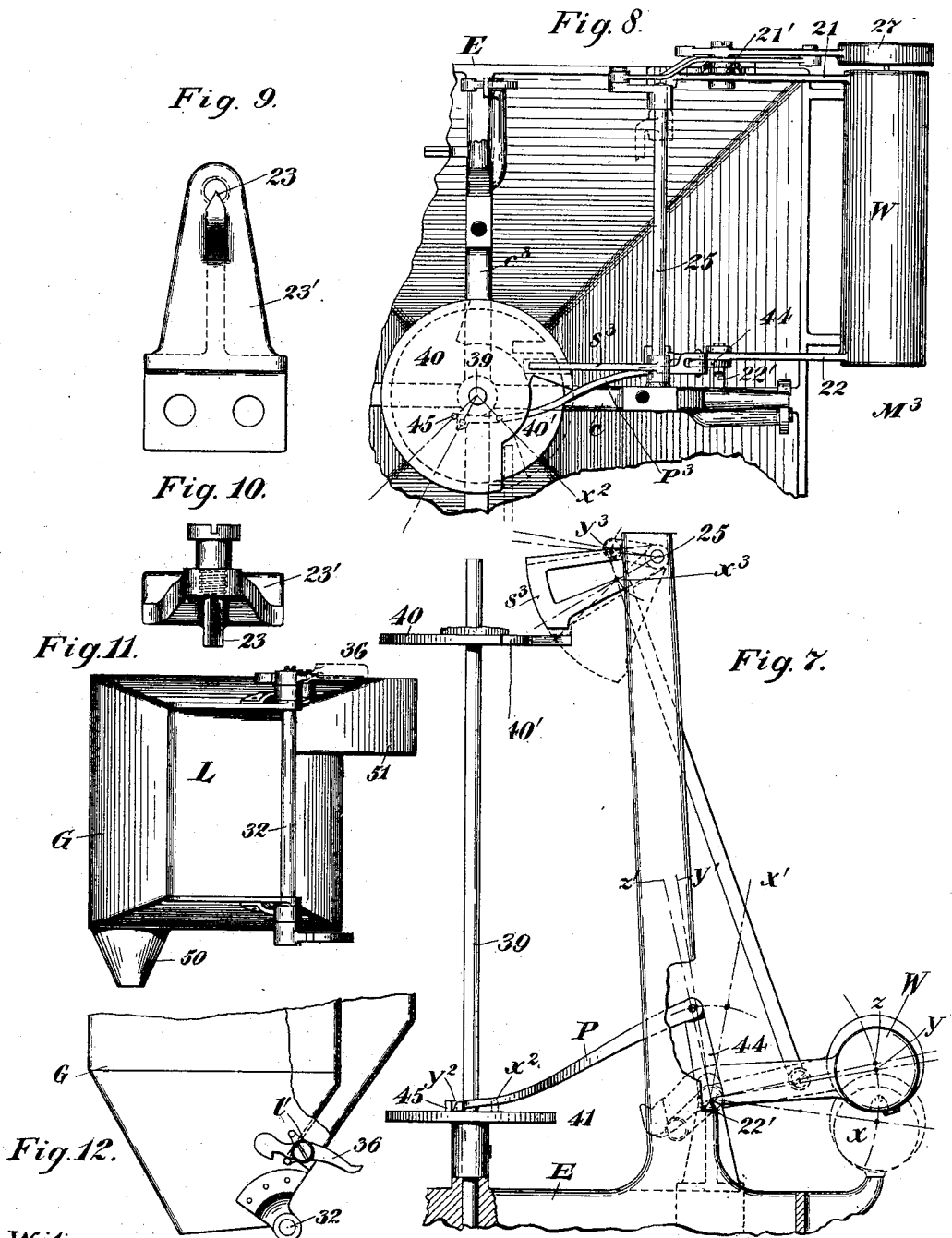
Witnesses.
R. W. Pittman
Fred. J. Dole.
Inventor.
F. H. Richards

UNITED STATES PATENT OFFICE.

FRANCIS H. RICHARDS, OF HARTFORD, CONNECTICUT.

WEIGHING APPARATUS.

SPECIFICATION forming part of Letters Patent No. 615,198, dated November 29, 1898.

Application filed November 26, 1897. Serial No. 659,837. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing Apparatus, of which the following is a specification.

This invention relates to weighing apparatus, one object of the invention being to provide a multiplex weighing apparatus comprehending a series of interdependent successively-operative weighing mechanisms of the "rising-poise" type, each including a load-receiver, means for supplying overloads to said receivers, and load-reducing instrumentalities effective for discharging the surplus of one receiver directly into another receiver.

A further object of the invention is to furnish an improved multiplex weighing apparatus comprehending a series of interdependent weighing-machines disposed in a circuit and each including a load-receiver, overload-supplying means controlled by the weighing mechanisms and effective for supplying overloads to the successive receivers in consecutive order, a series of improved load-reducing devices operative in consecutive order and during the supply of material to the succeeding receivers for discharging the surplus of preceding overloaded receivers into adjacent succeeding non-overloaded receivers, and improved load-discharging instrumentalities operative on the rising movements of successive receivers for discharging the loads of said receivers in consecutive order, whereby the overloading, load-reducing, and load-discharging operations of each weighing mechanism will be effected in proper sequential order and whereby corresponding operations of the successive machines will be effected in the respective order and whereby surplus of successive overloaded machines will be discharged directly into succeeding non-overloaded machines.

A further object of the invention is to provide in a multiplex weighing apparatus, including a series of weighing mechanisms, each embodying a load-receiver and in connection with supplying means embodying a series of valves for controlling the supply to the different receivers, improved interlocking mechanism comprehending a rotative blocking device and means operative with the successive weighing mechanisms on the successive descending movements of successive load-receivers for imparting step-by-step advancing movements to the rotative blocking device, whereby at each descent of a load-receiver an opening movement of one valve will be effected and all of the other valves will be locked in their closed positions and whereby the opening movements of the valves will take place in successive order and will be dependent upon the closure of the next succeeding valve and the overloading of the next succeeding receiver.

A further object of my present invention is to provide a weighing-machine comprehending two counterweighted beams having coincident but independent pivotal supports intermediate their ends and one of which beams constitutes a load-receiver carrier and the other of which constitutes a valve-actuator.

A further object of the invention is to provide in a multiplex weighing apparatus, including a series of successive weighing-machines, a register and a register-actuating device common to and successively operated by the successive weighing-machines.

Figure 2:
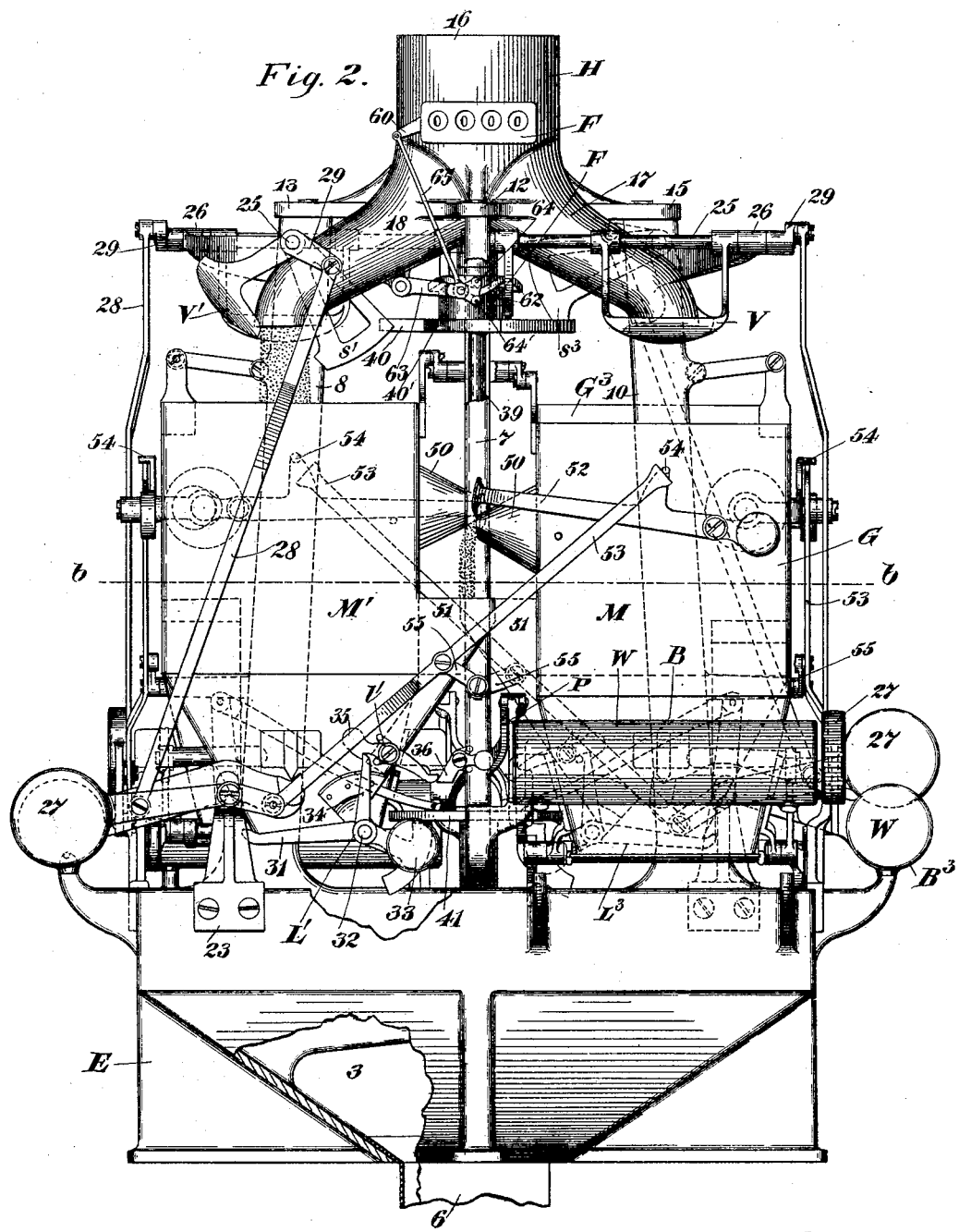
Figure 3:
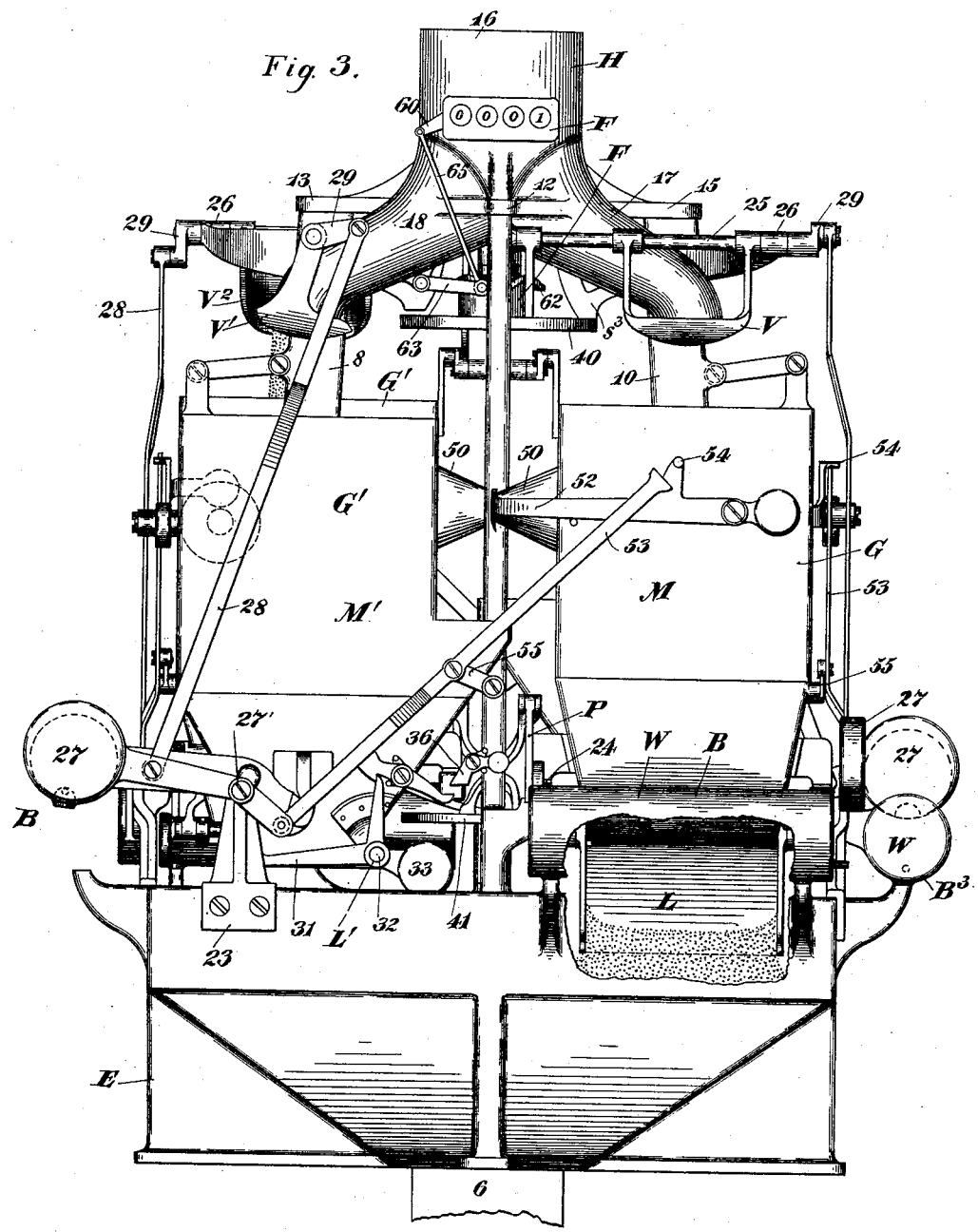
Figure 4:
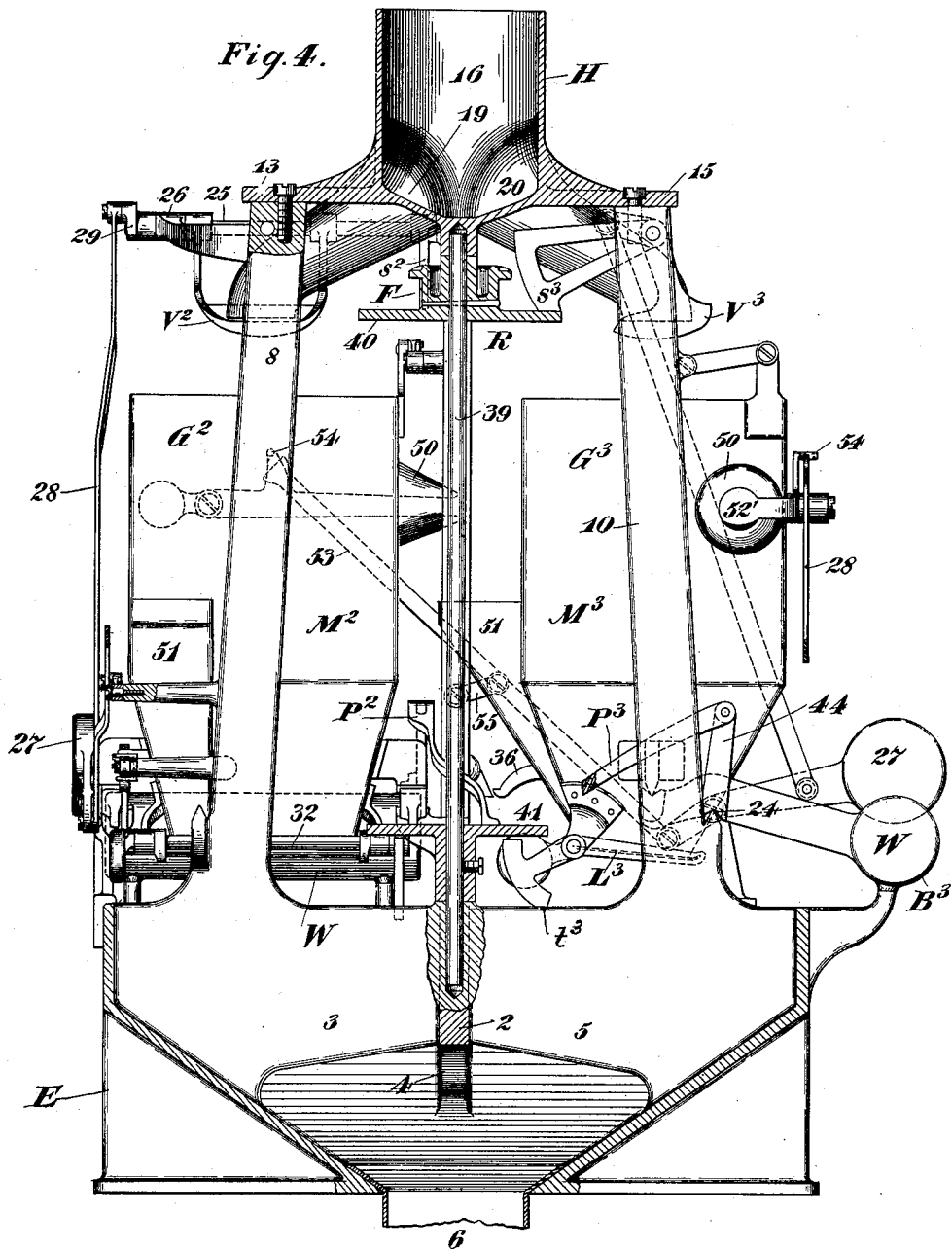
Figure 5:
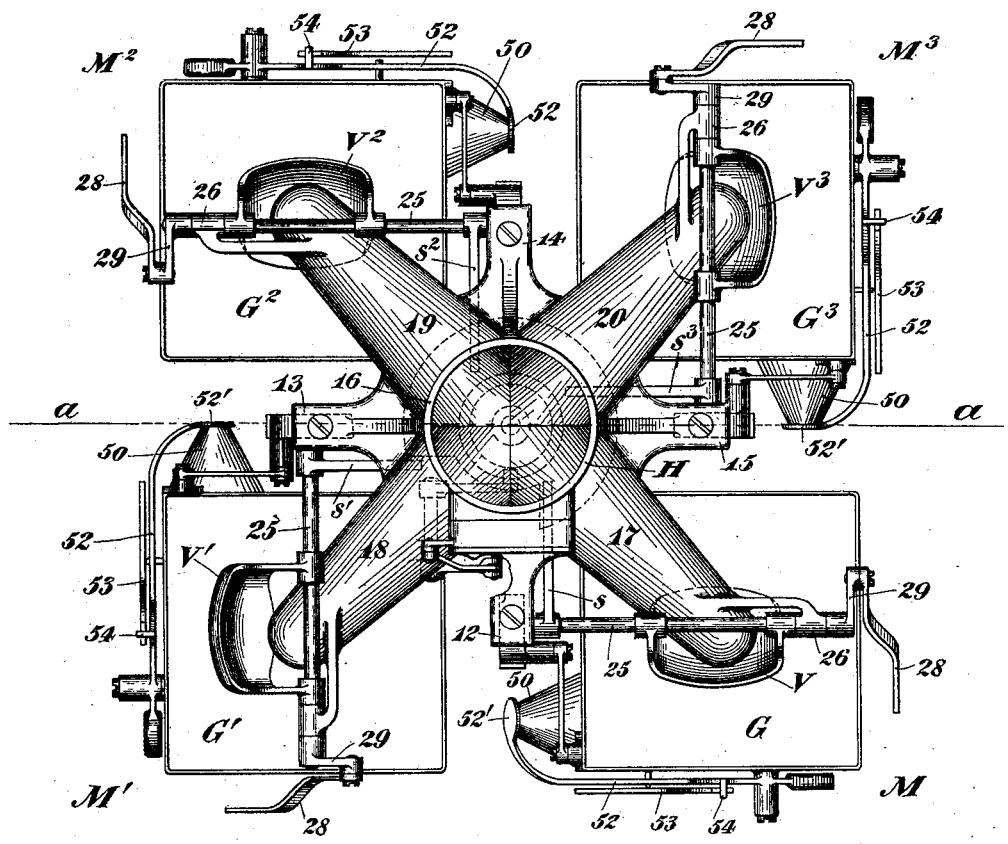
Figure 6:
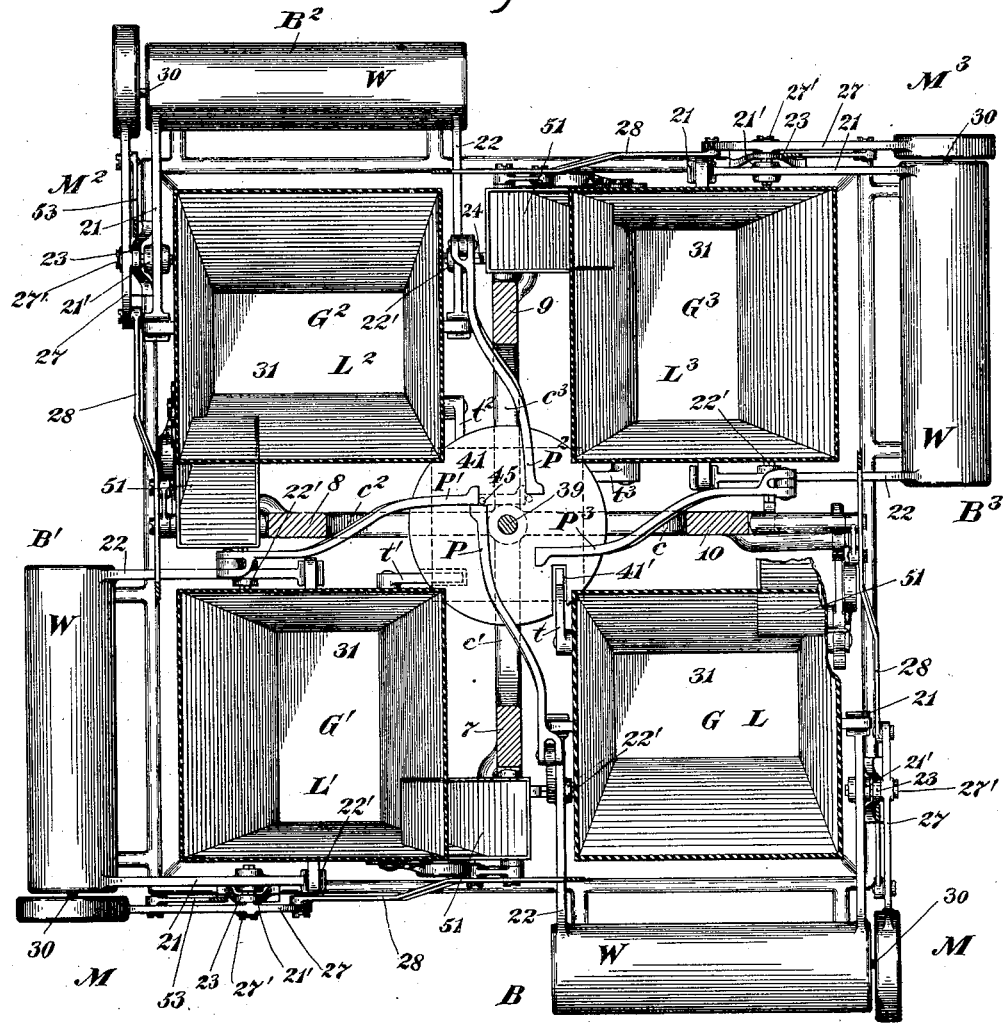

In the drawings accompanying and forming part of this specification, Figure 1 is a front elevation of a multiplex "four-machine" weighing apparatus embodying my present invention, showing the several weighing mechanisms of the apparatus in what may be termed the "starting" positions, all of the supply-valves but one of the several machines being locked in their closed positions, the load-receiver of the first weighing mechanism, as M, being in its overloaded or overpoised position and the rotative blocking device being shown in position for releasing and facilitating an opening movement of the supply-valve of the next adjacent preceding machine. Fig. 2 is a front elevation similar to Fig. 1, said figure showing the parts of the apparatus in the positions they occupy when the receiver of the first machine, as M, of the circuit of weighing-machines is in its overloaded position and the supply-valve of the second machine, as M', is in its open position and is supplying a load to the second receiver, the valve of the load-reducing device of the first receiver being shown elevated by the reducing-valve actuator connected with the supply-valve actuator of the second machine and in position to allow the surplus to be discharged into the second receiver. Fig. 3 is a front elevation similar to Figs. 1 and 2 of the machine, showing the first load-receiver, as M, in its poised load-discharging position, the valve of the second machine, as M', being in its overloaded or overpoised position and the valve of said second machine being shown closed and locked, the supply-valve of the third machine, as M², being at this time open and an overload being supplied to the receiver of said machine. Fig. 4 is a central vertical section, partially in elevation, of the weighing apparatus, taken on a line corresponding with the dotted line $a\,a$, Fig. 5, and showing the receivers of the weighing-machines M² and M³ in the positions they occupy when the machines M and M' are in the positions shown in Fig. 1. Fig. 5 is a plan view of that portion of the weighing apparatus located above the dotted line $b\,b$, Fig. 2, and showing the parts in positions corresponding to like parts shown in said Fig. 2. Fig. 6 is a horizontal cross-section of the weighing apparatus, taken on the dotted line $b\,b$, Fig. 2, and showing the parts below said line, portions of one of the load-receivers being broken away to more clearly illustrate certain parts in connection therewith. Fig. 7 is a side elevation of a portion of the weighing apparatus, illustrating in a diagrammatic way the operations or movements of one beam mechanism, one valve-actuator, and the interlocking instrumentalities in connection therewith. Fig. 8 is a plan view of the parts illustrated in Fig. 7. Figs. 9 and 10 are side and plan views, respectively, of one of the supporting-brackets for the scale-beam and valve-actuator. Fig. 11 is an under side view of one of the load-receivers; and Fig. 12 is a side elevation, partially in section, of a portion of the lower end of one of the load-receivers.

Similar characters designate like parts in all the figures of the drawings.

In the organization thereof illustrated in the accompanying drawings the multiplex weighing apparatus is shown comprehending four weighing mechanisms disposed in a circuit and designated in a general way by M, M', M², and M³, respectively, each weighing mechanism including oscillatory beam mechanism and a load-receiver mounted thereon; but it is to be distinctly understood that while the organization illustrated may in practice be most desirable I do not wish to limit this invention to any particular number of weighing mechanisms or to any particular arrangement of said mechanisms, as these may be variously modified within the purview of said invention.

The term "weighing mechanism" as herein employed signifies, as in the accepted definition of said term, the beam mechanism and the load-receiver supported on said beam mechanism, and the term "weighing-machine" as herein employed signifies a scale-beam, a load-receiver supported thereon, a supply device for the load-receiver, a closer in connection with the load-receiver, valve and closer controlling instrumentalities, and a load-reducing device and actuating means therefor.

The framework for supporting the several weighing mechanisms and other parts of the multiplex weighing apparatus may be of any suitable general construction and is shown in the accompanying drawings consisting of a horizontally-rectangular supporting-base E, divided centrally and in transverse directions by a series of radially-disposed partitions 2, 3, 4, and 5 into a series of load-discharging conduits or compartments $c$, $c'$, $c^2$, and $c^3$, each having inclined bottom walls and all of which merge into a common discharge-chute 6 and a series of uprights or standards 7, 8, 9, and 10, extending upwardly from the outer ends of and preferably formed integral with the radial partitions 2, 3, 4, and 5, those designated by 7 and 9 being rectangularly disposed with those designated by 8 and 10. These standards or uprights are shown jointed together at their upper ends by a supply-hopper (designated in a general way by H) having equidistantly-disposed horizontal flanges 12, 13, 14, and 15 fixed to the upper ends of the standards 7, 8, 9, and 10, said hopper preferably comprising a main supply compartment or conduit 16, having in this instance four radially-disposed communicating branch conduits or chutes 17, 18, 19, and 20, whose discharge ends are disposed above and in position to supply material to the load-receivers G, G', G², and G³ of the weighing mechanisms M, M', M², and M³, respectively.

Inasmuch as the several weighing mechanisms are shown and will preferably be of duplicate construction and organization and as all of said weighing mechanisms are intended to operate in substantially the same manner a detailed description of the construction, organization, and operation of the several parts of one of said weighing mechanisms is deemed sufficient for a full understanding of these features of my present invention.

Each weighing mechanism comprises suitable beam mechanism and a load-receiver supported thereon, the several beam mechanisms being designated, respectively, by B, B', B², and B³ and the load-receivers supported thereon being designated by G, G', G², and G³, respectively.

Each beam mechanism is shown of the well-known "single-beam" type, and consists, preferably, of two parallel arms 21 and 22, having knife-edge bearings 21' and 22', respectively, intermediate their ends, which are supported on knife-edges 23 and 24 on the framework of the machine, the knife-edge 23 being shown formed on a bracket 23', bolted to the upper part of the base E of the machine, and the knife-edge 24 being shown formed on one of the uprights of the framework, as illustrated most clearly in Figs. 3, 4, 6, and 7 of the drawings. The parallel beam-arms of each beam are connected together at their outer ends by a counterweight W, and the load-receiver is furnished with knife-edges on opposite side walls thereof, which rest upon knife-edge bearings on the poising ends of the beam-arms in the usual manner.

The successive beams which support the load-receivers G, G', G², and G³, respectively, have their axes of oscillation in relatively transverse planes, the beam mechanism B having its axis in parallelism with the front wall of the base, the one B' having its axis of oscillation in parallelism with the left-hand side wall of said base, the one B² having its axis of oscillation in parallelism with the rear wall of said base, and the one B³ having its axis of oscillation in parallelism with the right-hand wall of the base, as illustrated most clearly in Fig. 6 of the drawings, and the load-receivers G, G', G², and G³, which are rectangular in cross-section, are disposed upon said beams so that their inner adjacent walls are in parallelism, each receiver, as shown, occupying one corner of a square. It will be obvious, however, that the dispositions of the beam mechanisms and load-receivers may be variously modified without departure from this invention.

The successive weighing-machines of the multiplex weighing apparatus are intended to perform their cycles of operations in succession—that is to say, an overload will be first supplied to the several load-receivers of the circuit in consecutive order, the overloading of preceding receivers being controlled by the successive weighing mechanisms on the descending movements of successive receivers, the surplus of the overloaded receivers will be discharged into the succeeding adjacent receivers concurrently with the supply of material to said preceding receivers, and the weighed loads of the successive receivers will then be discharged in consecutive order, and to accomplish this end I have provided interdependent successively-operative controlling instrumentalities the construction, organization, and operations of which will be hereinafter described.

The overload-supplying means comprises, in addition to the hopper H, having the radial supply-chutes for supplying material to the several receivers, a series of oscillatory valves or stream-controllers (designated by V, V', V², and V³, respectively) supported in operative relation with the successive supply-chutes 17, 18, 19, and 20, respectively.

Each valve, which is shown in the nature of a pan-valve, is fixed to a rock-shaft, as 25, the outer end of which is journaled in a bearing formed in a bracket 26, preferably constituting a part of the hopper H, and the inner end of which is journaled in a bearing in one of the uprights of the framework, said rock-shaft having its axis of movement preferably parallel to the axis of movement of the beam of the load-receiver located below said shaft.

As a convenient means for imparting opening and closing movements to the valve of each weighing-machine I have provided a valve opening and closing acuator, which, in the preferred form thereof shown in the accompanying drawings, consists of a counterweighted beam or lever 27, fulcrumed or pivotally supported at 27' intermediate its ends on the bracket 23', secured to the base E, and which actuator is supported for movement independent of but has its axis of movement coincident with the axis of movement of the scale-beam which supports the load-receiver or bucket. This actuator is operatively connected to the valve by means of a thrust member or link 28, which is pivoted at its lower end to the actuator intermediate the pivoted and weighted ends thereof and is pivoted at its upper end to a crank-arm 29, fixed to the rock-shaft 25. The disposition of the crank-arm and the connections between said crank-arm and actuator are such that on the descending movement of the counterweighted end of the actuator 27 an opening movement will be imparted to the valve, and on the ascending movement of said actuator a closing movement will be imparted to said valve. To effect a gradual closing movement of the valve concurrently with and in proportion to the descending movement of the load-receiver, the scale-beam which supports said load-receiver is furnished with a pin or projection 30, which engages a projection on the weighted end of the actuator 27 and is so disposed that on the ascending movement of the weighted end of the beam the weighted end of the actuator 27 will be elevated simultaneously therewith. Thus it will be seen that the valve which controls the supply of material to the load-receiver will have a gradual closing movement during the descending movement of said load-receiver.

For the purpose of blocking each preceding valve against opening movement until the next succeeding valve is in its fully-closed position and the load-receiver of the preceding weighing-machine is in its overpoised or surplus-discharging position I have provided interlocking mechanism of peculiar construction and organization adapted on the overloading of one receiver of the series for releasing the valve which controls the supply to the next preceding receiver and for simultaneously blocking the opening movement of all the other valves, which interlocking mechanism will be hereinafter fully described.

Each load-receiver of the series is provided with a load-discharger or closer, the closers of the successive receivers being designated in a general way by L, L', L², and L³, respectively, and each closer, in the form thereof shown in the accompanying drawings, comprises a flanged closer-plate 31, fixed to a rock-shaft 32, journaled in bearings on brackets secured to the side walls of the load-receiver at the lower end thereof, said rock-shaft 32 having a counterweight 33 for shutting the closer on the discharge of the load from the load-receiver and also having an upwardly-extended arm 34, normally engaged by a catch 35 on a gravitative closer-latch $l'$, pivotally supported intermediate its ends on the side wall of the load-receiver, and as a means for actuating the latch to throw the same out of engagement with the closer at a predetermined point in the ascending movement of the load-receiver I have provided a by-pass latch-tripper 36, pivotally supported on one of the uprights with the non-counterweighted end thereof normally in the path of movement of the inner non-counterweighted end of the latch. This closer-latch $l'$ is intended in the present instance for positively locking the closer against accidental opening movement, and, further, for insuring an opening movement of said closer at a predetermined point in the ascending movement of the load-receiver.

In addition to the closer-latch for locking the closer normally against opening movement I have provided an auxiliary closer-blocking device, which constitutes one element of the interlocking mechanism of the multiplex weighing apparatus and is operative for blocking the opening movement of the closer in case the closer-latch should be accidentally tripped or be thrown out of engagement with the closers prematurely.

The interlocking mechanism which controls the operations of the supply-valves V, V', $V^2$, and $V^3$ for the several machines and under certain conditions the operations of the closers L, L', $L^2$, and $L^3$ comprises, in the preferred form thereof shown in the accompanying drawings, a series of valve-stops $s$, $s'$, $s^2$, and $s^3$, a series of closer-stops $t$, $t'$, $t^2$, and $t^3$, fixed to and oscillating with the shafts of the closers L, L', $L^2$, and $L^3$, respectively, and a rotative blocking device (designated in a general way by R) coöperative with and effective at predetermined points in the successive movements to the successive weighing mechanisms for simultaneously unlocking a closer of one machine and a valve of the next adjacent machine and for concurrently blocking the opening movements of all of the other valve-stops and closer-stops.

The rotative stop-blocking device R, in the form thereof shown in the accompanying drawings, comprises a vertically-disposed shaft or supply-plate carrier 39, journaled at its upper end in a bearing depending from the central portion of the hopper H and journaled at its lower end in a bearing on the base E, midway between the several machines, and two horizontally-disposed stop-plates or blocking-plates 40 and 41, respectively, the one 40 of which is fixed to the shaft 39 near the upper end thereof and intersects the path of movement of the successive valve-stops $s$, $s'$, $s^2$, and $s^3$, and the one 41 of which is fixed to said shaft near the lower end thereof and intersects the path of movement of the closer-stops $t$, $t'$, $t^2$, and $t^3$.

The stop-plate 40 is so disposed with reference to the valve-stops that when the valves are in their closed positions said valve-stops will rest upon the upper face of said plate near the periphery thereof, and the stop-plate 41 is so disposed with relation to the closer-stops that when the closers are in their closed positions the stops of said closers will be located below and in close proximity to the under face of said stop-plate.

The stop-plate 40 has a portion of its periphery cut away or notched throughout a portion of its arc to facilitate the opening and closing movement of one valve, the let-off notch (designated by 40') of said plate being shown of a length substantially equal to one-fourth of the length of the periphery of said plate, so that on each quarter-turn of the plate 40 the forward end of the let-off notch will register with one valve-stop, allowing the valve-actuator to impart an opening movement to this valve, and upon a further advancing movement of said stop-plate 40, which will be effected, as hereinafter more fully described, by the beam mechanism of the load-receiver supplied by this opened valve, said notch will still register with and permit a valve-opening movement of the valve-stop, and upon the completion of this quarter-turn of the stop member a stop-blocking portion of the plate will be brought beneath and prevent a valve-opening movement of said stop.

The closer-blocking plate 41 is shown having a notch 41' extending inward from the periphery thereof, which is of slightly-greater width than the width of the closer-stop, and upon successive quarter-turns of the shaft the rotative carrier 39 will be brought into juxtaposition with and facilitate opening movements of the successive closer-stops in consecutive order.

As a convenient means for rotating the stop-plate carrier 39 to impart intermittent quarter-turn advancing movements thereto, one at each descending movement of each load-receiver, I have provided a pawl-and-ratchet device, which, in the preferred form thereof shown in the accompanying drawings, comprises a series of pawls P, P', $P^2$, and $P^3$, respectively, each of which is pivotally connected at its outer end to the upper end of a crank-arm 44, fixed to the pivoted portion of each scale-beam, and which pawl rides at its inner end upon the upper face of the stop-plate 41, and a ratchet projection or pin 45, fixed to the stop-plate 41 in position to be engaged successively by the inner ends of the pawls P, P', $P^2$, and $P^3$.

On the descending movement of one load-receiver, as G, the pawl P, in connection with the beam B thereof, will be advanced and will shift the ratchet-pin, together with the stop-plate 41 and its carrier, a quarter-turn about their common axis, leaving the ratchet-pin in position to be engaged by the next adjacent pawl P', which will on the descending movement of the load-receiver G' advance the pin from the position shown in full lines to the position shown in dotted lines in Fig. 6, and consequently advance the stop-plate 41 one-fourth of a complete rotation, each pawl acting on the descent of the poise end of the beams to which it is connected to advance the stop-plate 41 and rotative stop-plate carrier one-fourth of a complete rotation, as will be readily appreciated by reference to Figs. 6, 7, and 8 of the drawings.

The stop-plates 40 and 41 have their let-off notches so disposed relatively to each other that on the descent of the load-receiver G, which, through the medium of the valve-actuator, effects a closing movement of the valve V, a blocking portion of the stop-plate 40 will be brought in juxtaposition with the stop and prevent a closure of the valve V, and the notch 41' of the stop-plate 41 will be brought into register with the closer-stop to facilitate an opening movement of the closer L, when the closer-latch in locked engagement with this closer is tripped on the ascending movement of the load-receiver.

When the closer-plate 40 is in position to block the opening movement of the valve V and the plate 41 is in position to permit an opening movement of the closer L, the notch 40' of the plate 40 will be in position to permit an opening movement of the valve V' of the next adjacent machine, the plates 40 and 41 remaining in this position until the weighed load of the load-receiver G is discharged, after which and on the descending movement of the load-receiver G' of the next preceding machine the pawl P', connected with the beam mechanism of said load-receiver, will advance the stop-plate carrier and plates 40 and 41 a quarter-turn and into a position for locking the valve V' against opening movement and permitting an opening movement of the closer L' on the release of its closer-latch.

Each load-receiver is furnished intermediate its receiving and discharging ends with a surplus-discharge conduit 50 and a return-conduit 51, the discharge-conduit of each receiver being located, preferably, with its discharge end above and in position to discharge material into the return-conduit of the next preceding receiver.

As a means for controlling the discharge of the surplus from the successive load-receivers on overpoising movements of said receivers and on the opening movement of the supply-valve of the next adjacent preceding receiver I have provided a load-reducing valve 52, pivotally supported on the load-receiver and having a cut-off plate 52' in position for covering the discharge-opening of the surplus-discharge conduit 50, each valve being preferably of such construction that it will have a self-closing movement; but as a means for actuating the succeeding cut-off valves simultaneously with the opening movements of adjacent preceding supply-valves I have provided a series of actuators constructed and organized to impart valve-opening movements to succeeding load-reducing valves concurrently with the supply-valve-opening movements of the valve-actuators of preceding machines. Each load-reducing-valve actuator, in the preferred form thereof shown most clearly in Figs. 1 to 4 of the drawings, comprises a thrust-rod 53, pivotally connected at its lower end to the inner end of a supply-valve actuator of one machine and having its upper end in position to engage a projection 54 on and impart an opening movement to the load-reducing valve of the next adjacent succeeding machine, said thrust-rod being held in operative relation with the projection 54 on the load-reducing valve preferably by a link 55, which is pivotally connected at one end to the framework of the machine and at its opposite end to said thrust-rod.

From the foregoing description it will be seen that upon the gravitative movement of the supply-valve actuator of one machine, as M', the preceding machine, as M, being in its overload position, a load-reducing or opening movement will be imparted to the load-reducing valve of the next succeeding machine, thus effecting a discharge of the surplus of the receiver G into the return-conduit of the next succeeding receiver G', this operation of reducing the overload of the receiver G taking place during the overloading of the receiver G', the overloads of the successive receivers of the circuit of machines being reduced in consecutive order and the surplus being transferred from the respective receivers into the succeeding receivers in consecutive order and during the supply of material to said preceding receivers.

After the load of each successive receiver is sufficiently reduced to cause the load-receiver to rise to a truly-poised position the closer-latch of said receiver will concurrently with the arrival of said load-receiver at its truly-poised position strike the by-pass latch-tripper, which will trip the latch and release the closer, allowing the same to be opened by the weight of the load, which load is discharged into one of the compartments or discharge-conduits of the base E, the discharge of the loads from the successive load-receivers occurring in successive order, the load of a succeeding receiver being of course discharged before sufficient material has been supplied to the next preceding receiver to cause said receiver to descend and rotate the stop-plate carrier.

As a means for positively preventing the descent of each load-receiver until an overload has been supplied thereto the counterpoise-weight of the beam mechanism which supports said receiver will be substantially equal to the weight of a true load, and which weight is augmented more or less by the weight of the valve-actuator, which must be lifted by the beam mechanism before the load-receiver can descend.

Referring to Figs. 7 and 8 of the drawings, which are somewhat in the nature of diagrammatic views illustrating the relative movements of one beam, one valve-stop, and the stop-plates, it will be seen that the beam travels in its ascending movement or during the descent of the load-receiver successively from the dotted-line position designated by $x$ to the dotted-line positions indicated by $y$ and $z$.

During the first stages of the rising movement of the counterweighted end of the beam or from the position indicated by $x$ to the position indicated by $y$, Fig. 7, the crank-arm 44, fixed to the beam, travels from the position indicated by the radial line $x'$ to the position indicated by the radial line $y'$, advancing the ratchet-pin-engaging end of the pawl from $x^2$ to $y^2$, thus shifting the stop-plate carrier and stop-plates one-fourth slightly more than of a complete rotation. This movement of the beam lifts the valve-actuator concurrently and shifts the valve, with its stop-face, from the position indicated in dotted lines at $x^3$ to the position indicated at $y^3$. When the valve-stop and the stop member 40 are in these positions, it will be seen that the let-off notch in the stop-plate 40 still registers with the valve-stop. Therefore it is necessary to further advance the stop-plate to bring a blocking portion underneath the valve-stop. Therefore the beam and valve-actuator are organized to have a movement of sufficient range to advance the stop-plate carrier a fraction more than one-fourth of a complete rotation, said parts traveling from the position indicated by $y$ to the position indicated by $z$, thus elevating the valve-stop, with its stop-face, a short distance above the stop-plate 40 and simultaneously advancing the stop-plate sufficiently to bring a solid portion of the periphery underneath and in position to block the descending movement of said valve-stop. On the descending movement of the valve-actuator the hereinbefore-described movements of the pawl and valve-stop are reversed.

For the purpose of indicating the number of loads discharged by the successive weighing-machines of the multiplex weighing apparatus I have provided an improved registering apparatus which, in the preferred form thereof shown in the accompanying drawings, comprises the register proper, (designated in a general way by F and shown secured to the hopper H at one side thereof,) which is furnished with a reciprocatory actuating member or arm 60 and a registering actuating device (designated in a general way by F') common to and having successive registering movements imparted thereto by the successive weighing mechanisms, said register-actuating device being operatively connected with the reciprocatory member of the register. This register-actuator is shown as a four-lobe cam 61, fixed to and rotative with the stop-plate carrier 39, said cam having a circumferentially-disposed track comprising a series of working faces or lobes 62, or, in other words, the track has a series of equidistantly-disposed depressed register-actuating portions. The connection between the actuating-cam and the reciprocatory member of the register is shown as an arm 63, pivotally secured at its outer end to a bracket on one of the supply-chutes and having at the inner end thereof a pair of rolls 64 and 64', one of which bears against the upper and the other against the lower face of the cam-track and a thrust rod or member 65, pivotally secured at its lower end to the inner end of the arm 63 and at its upper end to the reciprocatory member 60 of the register.

The construction and organization of the register-actuator are such that on successive rotative movements of the stop-plate carrier, through the medium of the successive weighing mechanisms, as hereinbefore described, successive registering movements will be imparted to the reciprocatory member of the register at each descent of a load-receiver, as will be readily understood by a comparison of the several figures of the drawings.

Having described my invention, I claim—

1. The combination, with weighing mechanism including a load-receiver having a closer, of a primary stop carried by said closer; a secondary stop rotative in a path transverse to, and intersecting the path of, the closer-stop; and means controlled by the weighing mechanism for imparting rotative movements to said secondary stop.

2. The combination, in a multiplex weighing apparatus, of two load-receivers each of which is furnished with an oscillatory closer; two primary stops carried one by each closer; and a secondary stop supported for rotative movement in a path transverse to, and intersecting the paths of oscillation of, and effective for alternately blocking the movements of, the two primary stops.

3. In a multiplex weighing apparatus, the combination, with a plurality of weighing mechanisms each including a load-receiver having an oscillatory closer, of a multiplicity of stops carried one by each closer; a stop-plate supported for rotative movement in a path transversely to, and intersecting, the paths of oscillation of the stops, and having a peripheral notch adapted to register with the stops successively and facilitate opening and closing movements of the closers, and means controlled by the weighing mechanisms for imparting intermittent rotative movements to the stop-plate.

4. The combination, with weighing mechanism including a load-receiver having a self-shutting closer pivotally supported for vertical oscillatory movement, of a stop carried by said closer; a horizontally-rotative stop-plate normally intersecting the path of the closer-stop and having a peripheral stop-releasing notch for facilitating a closer-opening movement for said closer-stop; and a pawland-ratchet device actuated by the weighing mechanism for imparting intermittent rotative movements to the stop-plate.

5. The combination, with weighing mechanism including a load-receiver having a closer and with stream-supplying means including a valve, of two primary stops one of which is carried by the closer and the other by the valve; a secondary stop device including a rotary stop-plate carrier having mounted thereon two stop-plates coöperative with the primary stops; and means controlled by the weighing mechanism for intermittently rotating the carrier to release the primary stop alternately.

6. A multiplex weighing apparatus including a plurality of weighing mechanisms each having a load-receiver; a plurality of stream-supplying chutes or spouts having each an oscillatory valve; a plurality of valve-stops carried one by each valve and oscillatory in a vertical plane; a horizontally-rotative peripherally-notched plate having its axis substantially midway between the axes of movement of the several valves and intersecting the path of movement of the valve-stops; and means controlled by the successive weighing mechanisms for imparting a step-by-step rotative movement to said stop-plates to normally lock one of said valve-stops against movement and to release and facilitate a valve-opening movement of another of said valve-stops.

7. The combination, with a supply apparatus including a series of supply-spouts the discharge ends of which are disposed substantially equidistantly about a common center, of a series of self-closing valves one in operative relation with each supply-spout and having their axes of movement in horizontal planes; a series of valve-stops one carried by each valve; a secondary stop-plate rotative about a vertical axis coincident with said common center, said plate intersecting the path of movement of the several stops and having a notched peripheral portion; and means for intermittently rotating the secondary stop-plate to bring the notched portion thereof into position for successively releasing the successive valve-stops.

8. In a weighing-machine, the combination, with an oscillatory supply-valve and an oscillatory bucket-closer, of two primary stops one of which is carried by the valve and the other by the closer; a secondary stop-disk supported on a common carrier, one above the other, for rotation in a plane transverse to, and intersecting, the path of oscillation of the valve-stop and closer-stop, respectively, and each having a stop-releasing notch in the periphery thereof, said notches being so disposed relatively to one another as to release the primary stop in alternating order; and means for intermittently rotating the carrier.

9. The combination, with a load-receiver having a self-shutting oscillatory closer, of a latch coöperative with, and normally holding, the closer in its shut position; a stop carried by said closer; a segment-disk supported for rotative movement in a plane intersecting the path of oscillation of the closer-stop and normally blocking said closer-stop against closer-opening movement; and means for intermittently imparting rotative movements to said segment-disk.

10. The combination, with a pair of weighing mechanisms each including a load-receiver having a load-reducing valve, of a supply-chute in operative relation with each receiver and having a valve; a valve-actuator in connection with each valve and controlled by the weighing mechanism; and means operative with the valve-actuator of one weighing mechanism for actuating the load-reducing valve of the receiver of the next adjacent weighing mechanism.

11. The combination, with a scale-beam and with a load-receiver supported on said beam, of stream-supplying means including an oscillatory valve; a counterweighted actuating lever or beam pivotally supported independently of, and having its axis coincident with, the scale-beam; and an actuating-connector between said actuating-lever and valve.

12. In a weighing-machine, the combination, with a load-receiver and with an oscillatory stream-controller, of two non-connected weighted beams fulcrumed on the framework with their axes coincident, and one of which beams supports the load-receiver, and the other of which beams is operatively connected with the stream-controller, and means on the load-receiver-supporting beam for elevating the other beam on the descent of said load-receiver.

13. In a weighing-machine, the combination, with a load-receiver and with an oscillatory stream-controller, of two disconnected weighted beams supported side by side and fulcrumed on the framework with their axes coincident, and one of which beams constitutes a load-receiver support, and the other of which beams constitutes a controller-actuator; means on the receiver-supporting beam for elevating the controlling actuating-beam on the descent of the load-receiver; and means operative, on the elevation of the controller-actuating beam, for temporarily locking the same against descending movement.

14. The combination, with a plurality of weighing mechanisms each including a load-receiver having a surplus-discharging conduit and a return-conduit, the discharge-conduit of each receiver of which is located above the return-conduit of the next advancing receiver; a gravitative load-reducing valve supported upon each receiver and normally closing the outlet of the discharge-conduit thereof, and each reducing-valve having a projection; and a plurality of valve-opening actuators in operative relation with said valves, the valve-actuators of succeeding valves being controlled in their movements by preceding weighing mechanisms.

15. The combination, with a first weighing mechanism including a load-receiver having a valve-controlled surplus-discharger, of a second weighing mechanism controlled in its operation by the first weighing mechanism and including means for actuating the surplus-discharge valve of said first weighing mechanism.

16. A multiplex weighing apparatus including two interdependent weighing-machines each of which includes a load-receiver having a valve-controlled surplus-discharger; overload-supply means including a pair of valves for controlling the supply of material to the two load-receivers; means controlled by the weighing mechanism of the first machine for effecting an opening movement of the supply-valve of the second machine; means controlled by an oscillatory movement of the second machine, on the opening movement of the supply-valve thereof, for imparting an opening movement to the valve of the surplus-discharger of the first machine; and a surplus-receiver communicating with the second machine and having its receiving end in position to receive the discharge from the receiver of the first machine.

17. In a multiplex weighing apparatus comprehending a multiplicity of successively-operative interdependent weighing-machines disposed in a circuit and each including a load-receiver having a surplus-discharge conduit and a return-conduit, the discharge-conduit of one receiver being in operative relation with the return-conduit of the next adjacent receiver; gravitative load-reducing valves pivotally supported one on each receiver and normally closing the outlet of the discharge-conduit thereof; overload-supplying means including a plurality of oscillatory valves for controlling the supply of material to the successive receivers, respectively; means controlled by the weighing mechanisms of one machine, on the descending movement thereof, for releasing and facilitating an opening movement of the supply-valve of the next adjacent machine, and for simultaneously blocking the opening movement of the supply-valves of the other machines; a gravitative valve-opening actuator in connection with each supply-valve; and means controlled by the valve-opening actuators of preceding machines for imparting opening movements to the load-reducing valves of succeeding machines, successively and concurrently with the opening movements of the supply-valve of preceding machines.

18. The combination, with weighing mechanism including a load-receiver having a gravitative self-shutting closer, of two coöperative stop members one of which is carried by said closer, and the other of which is pivotally supported on the framework for rotation in a plane intersecting the path of movement of the other, and has recesses for facilitating an opening movement of the closer-stop; means controlled by the weighing mechanism for imparting a step-by-step advancing movement to the rotative stop; an arm carried by the closer; a latch normally engaging said arm; and means operative, on the ascending movement of the load-receiver, for releasing said latch.

19. In a weighing-machine, the combination, with the framework, of an oscillatory weighted scale-beam fulcrumed on said framework and having a counterbalancing efficiency equal to the weight of the load to be weighed; a load-receiver supported on the poising end of the scale-beam; stream-supplying means including an oscillatory valve; a counterweighted gravitative valve-actuator fulcrumed on the framework independent of the scale-beam at one side thereof; an actuating-connector between the valve-actuator and valve; and means for elevating the weighted end of the valve-actuator concurrently with the descent of the load-receiver.

20. The combination, with oscillatory beam mechanism and with a load-receiver supported thereon and having a gravitative closer, of stream-supplying means including an oscillatory supply-valve; interlocking mechanism between the valve and closer and including a rotative stop device; and a stop-actuating device including a pawl and ratchet the former of which is operative with the beam mechanism and is effective for imparting intermittent advancing movements to the rotative stop device.

21. In a multiplex weighing apparatus, the combination, with two independent counterweighted scale-beams pivotally supported intermediate their ends for oscillatory movements and with two load-receivers supported, respectively, on the poising end of said beams, of overload-supplying means including valves for controlling the supply of material to the load-receivers; a load-reducing device in connection with each load-receiver; two valve-actuating beams supported independent of, but with their axes coincident with, the axes of oscillation of the scale-beams, respectively; a link connecting each valve-actuator with the supply-controlling valve; and a thrust-rod in operative connection with the valve-actuator and effective, on the valve-opening movement of said actuator, for operating the load-reducing means of the next adjacent load-receiver.

22. A multiplex weighing apparatus comprehending a plurality of weighing-machines disposed side by side in a circuit and each including a load-receiver; a supply-hopper having a series of radially-disposed supply-spouts the discharge ends of which are disposed, respectively, above the successive receivers; a series of counterbalanced oscillatory valves one in connection with each supply-spout, and each embodying an oscillatory stop member; a vertically-disposed stop-plate-carrying shaft journaled at its upper end in a bearing disposed substantially midway between the supply-spouts, and journaled at its lower end in the base of the framework; a peripherally-notched stop-plate fixed to the upper end of said shaft and normally blocking the valve-opening movement of all but one of the valve-stops; and means controlled by the weighing mechanism, on successive operations thereof, for imparting intermittent rotative movements to the vertically-disposed shaft, to thereby release the valve-stops in consecutive order.

23. The combination, with weighing mechanism including a load-receiver having an oscillatory closer and with a supply-chute having an oscillatory valve, of two primary stops one of which is carried by the closer and the other of which is carried by the valve; a vertically-disposed stop-plate-carrying shaft journaled at its upper and lower end in the framework at one side the load-receiver; two peripherally-notched horizontally-disposed stop-plates fixed, respectively, to opposite ends of said shaft in position to coöperate with the stops and block the opening movements of the closer and valve; and means operative with the weighing mechanism for imparting intermittent rotative movements to said shaft.

24. The combination, with a series of weighing mechanisms disposed in a circuit and each including a load-receiver having an oscillatory closer furnished with a stop and with a supply apparatus including a series of valves for controlling the supply of material to the several load-receivers, respectively, and each valve having a stop, of a stop-blocking device comprising a vertically-disposed shaft supported midway between the several receivers and stops, and two horizontally-disposed peripherally-notched stop-plates fixed to said shaft at opposite ends thereof, one below and intersecting the path of movement of the supply-valve and above and intersecting the path of movement of the closer-stops; and means controlled by the weighing mechanisms for intermittently imparting rotative movements to said blocking device.

25. The combination, with a plurality of weighing mechanisms each including a load-receiver having a closer and with a supply apparatus including a series of valves controlling the supply to the different load-receivers, of interlocking instrumentalities operative, on the overpoising movement of one load-receiver, for effecting an opening movement of the next adjacent receiver, and for simultaneously blocking the opening movements of all the other supply-valves.

26. The combination, with a plurality of weighing mechanisms each including a load-receiver having a closer and with supply apparatus including a series of valves for controlling the supply to the different load-receivers, of interlocking instrumentalities embodying a series of oscillatory stops carried by the valves, respectively, and a rotative blocking device coöperative with said stops and effective, on the descending or overpoising movements of one weighing mechanism, for releasing one valve-stop and blocking the movement of all the successive stops.

27. The combination, with a plurality of weighing mechanisms each including a load-receiver having a closer and with supply apparatus including a series of valves for controlling the supply to the different load-receivers, of interlocking instrumentalities embodying a series of oscillatory stops carried by the valves, respectively; a rotative blocking device coöperative with said stops and effective, on the descending or overpoising movement of one weighing mechanism, for releasing one valve-stop and blocking the movement of all the successive stops; and a pawl-and-ratchet device coöperative with the successive weighing mechanisms, on successive movements thereof, for imparting intermittent rotative movements to said blocking device.

28. The combination, with a plurality of weighing mechanisms each including a load-receiver having a closer and with supply apparatus including a series of valves for controlling the supply to the different load-receivers, of interlocking instrumentalities embodying a series of oscillatory stops one carried by each valve and one carried by each closer, and the valve-stops and the closer-stops being disposed in two independent circuits, and a rotative blocking device operative, on the descending movement of each successive load-receiver, for releasing the closer-stops of said receiver and blocking the movements of all the other closer-stops, and for simultaneously effecting an opening movement of the valve-stops of the next adjacent receiver and blocking the movement of all the other valve-stops.

29. The combination, with a plurality of independently-supported and independently-acting weighing mechanisms, of a register, and a register-actuator common to all of the weighing mechanisms.

30. The combination, with a plurality of weighing mechanisms, of means for overloading the same; means for removing the surplus from one weighing mechanism and supplying it to another weighing mechanism; a register; and a register-actuator common to all of the weighing mechanisms.

31. The combination, with weighing mechanisms, of a register; a rotative register-actuator common to all the weighing mechanisms and including a series of cam-faces corresponding in number to the number of weighing mechanisms; a reciprocatory member in connection with the register and in operative relation with said cam-faces; and means controlled by the successive weighing mechanisms for imparting a step-by-step rotative movement to the register-actuator.

32. The combination, with a plurality of weighing mechanisms, of a register having a reciprocatory actuating member; register-actuating mechanism common to all the weighing mechanisms and including a rotative actuator having a plurality of equidistantly-disposed cam-faces; an oscillatory member in connection with the cam-faces of the rotative actuator; an actuating-connector between the reciprocatory member of the register and said oscillatory member; and means successively actuated by the successive weighing mechanisms for imparting intermittent rotative movements to the register-actuator.

33. The combination, with a plurality of weighing mechanisms, of a regulator having a reciprocatory actuating member; register-actuating mechanism common to all the weighing mechanisms and including a rotative actuator having a plurality of equidistantly-disposed cam-faces; an oscillatory member in connection with the cam-faces of the rotative actuator; an actuating-connector between the reciprocatory member of the register and said oscillatory member; and a pawl-and-ratchet device common to all the weighing mechanisms and effective, on successive movements of said mechanisms, for imparting step-by-step rotative movements to said register-actuator.

34. The combination, with a plurality of weighing mechanisms, of a register having a reciprocatory actuating member; register-actuating mechanism common to all the weighing mechanisms and including a rotative actuator having a plurality of equidistantly-disposed cam-faces; an oscillatory member in connection with the cam-faces of the rotative actuator; an actuating-connector between the reciprocatory member of the register and said oscillatory member; a ratchet in connection with the rotative register-actuator; and a plurality of pawls one operated by each weighing mechanism and effective, on a predetermined movement of each mechanism, for imparting a rotative movement to the ratchet and connected register-actuator.

FRANCIS H. RICHARDS.

Witnesses:
F. N. CHASE,
JOHN O. SEIFERT.